United States Patent [19]

Bogosh

[11] 4,070,916
[45] Jan. 31, 1978

[54] SPEEDOMETER-ODOMETER APPARATUS

[76] Inventor: Donald Bogosh, 2646 Willow St., Franklin Park, Ill. 60131

[21] Appl. No.: 741,734

[22] Filed: Nov. 15, 1976

[51] Int. Cl.² .................. G01C 22/00; G01C 23/00
[52] U.S. Cl. ................................................ 73/490
[58] Field of Search ...................... 73/490; 74/416; 235/95 R

[56] References Cited

U.S. PATENT DOCUMENTS

| 591,761 | 10/1897 | Hart | 235/95 R |
|---|---|---|---|
| 1,205,357 | 11/1916 | Kloneck | 73/490 |
| 1,683,758 | 9/1928 | Candee et al. | 74/416 X |
| 1,788,871 | 1/1931 | Helgeby | 235/95 R X |
| 3,768,315 | 10/1973 | Powell | 73/490 |

FOREIGN PATENT DOCUMENTS

| 709,765 | 5/1931 | France | 73/490 |

*Primary Examiner*—James J. Gill
*Attorney, Agent, or Firm*—Robert E. Wagner; Robert E. Browne; Gerald T. Shekleton

[57] ABSTRACT

An apparatus disposed in a speedometer-odometer drive assembly for transferring and translating the rotation of a speedometer drive cable to a speedometer needle registering speed and an odometer registering distance, having a field cup disposed at one end of a drive shaft in communication with the speedometer cable and rotatable about a central axis with this shaft. The rim of the field cup is discontinuous at at least one point about its periphery by virtue of a cut or split being upset with respect to the radial plane of the surface of the field cup rim. These cut or split edges of the field cup rim act to engage successive threads or teeth on a gear means driving the odometer as the field cup rotates. A flux cup is inserted into the field cup to cover a magnet mounted within the field cup. The flux cup responds to the magnetic field created by the rotating magnet, thereby driving said speedometer. The gear means driving the odometer comprise a camming means fixedly mounted on a face gear. A cam follower translates the rotation of said camming means, caused by the engagement of the field cup rim with the face gear, into oscillatory motion of a drive arm, which causes the successive engagement and disengagement of a gear-engaging means to rotate the odometer drive means in one direction only.

7 Claims, 11 Drawing Figures

U.S. Patent  Jan. 31, 1978  Sheet 1 of 3  4,070,916
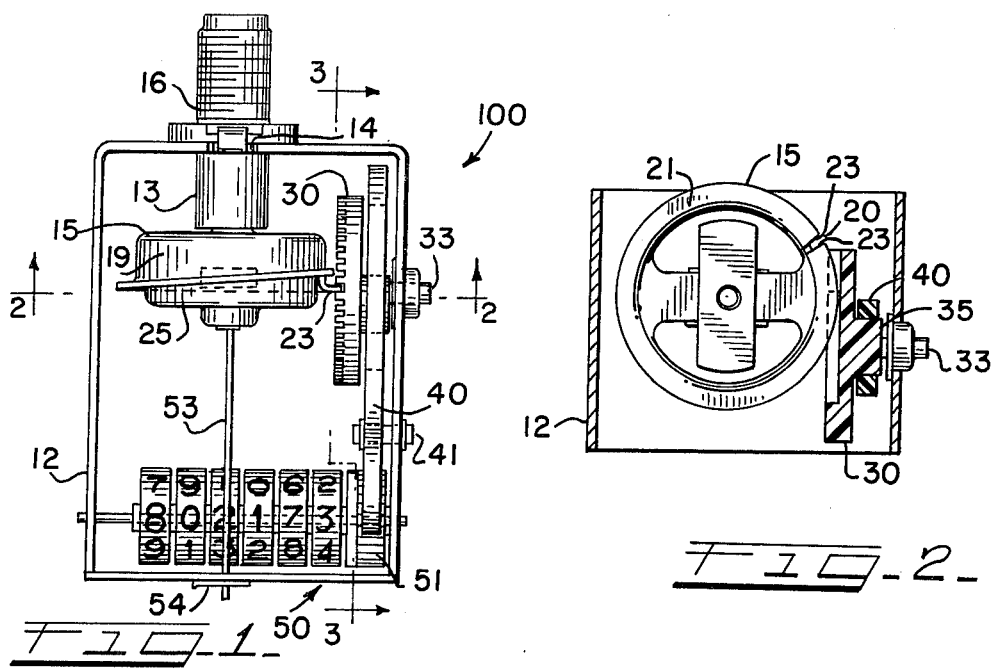
Fig. 1.
Fig. 2.
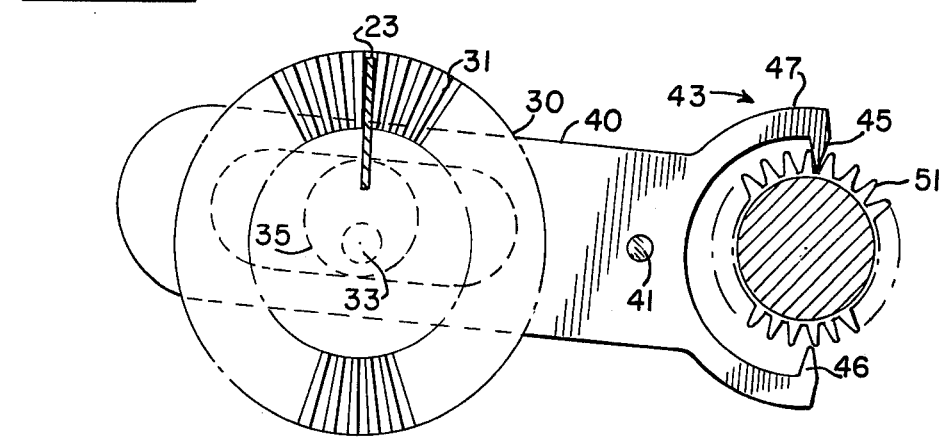
Fig. 3.
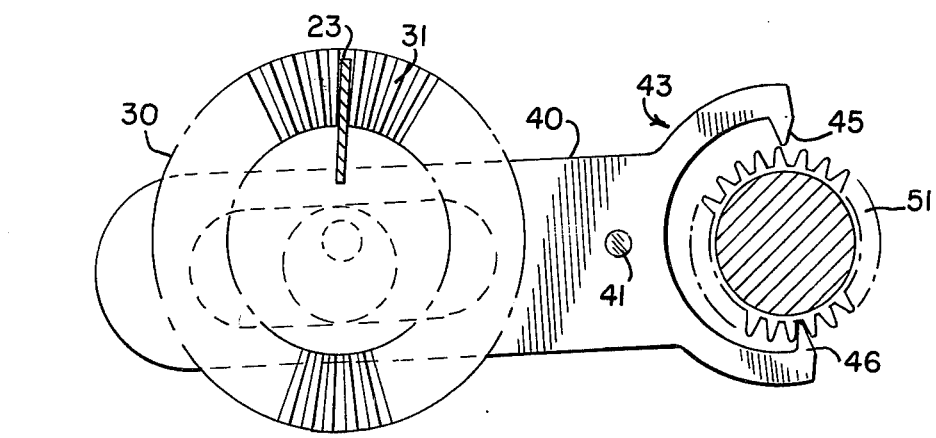
Fig. 4.

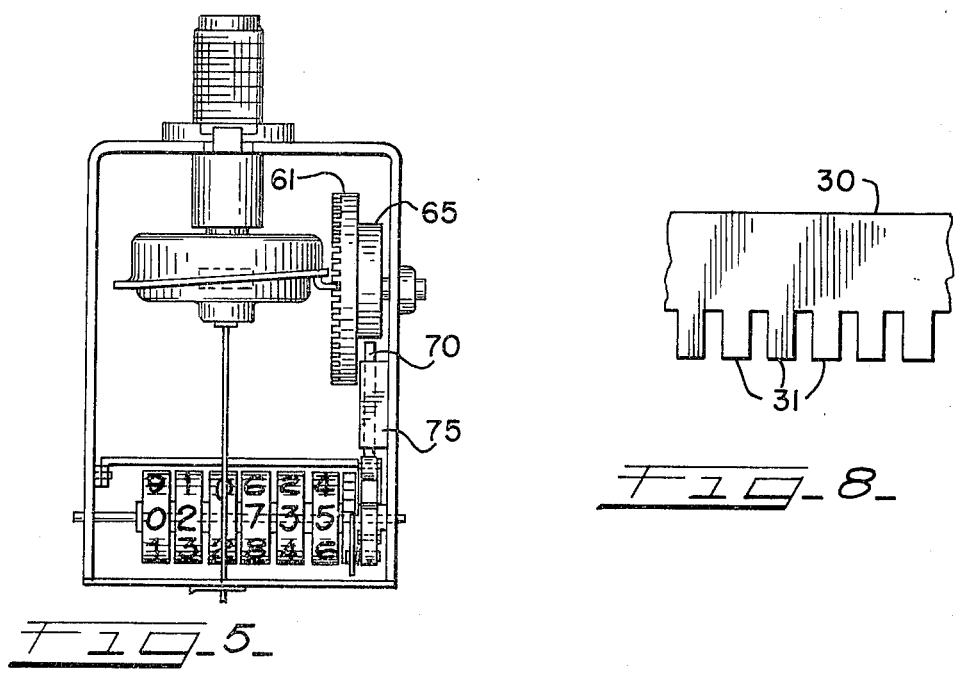
Fig. 5
Fig. 8
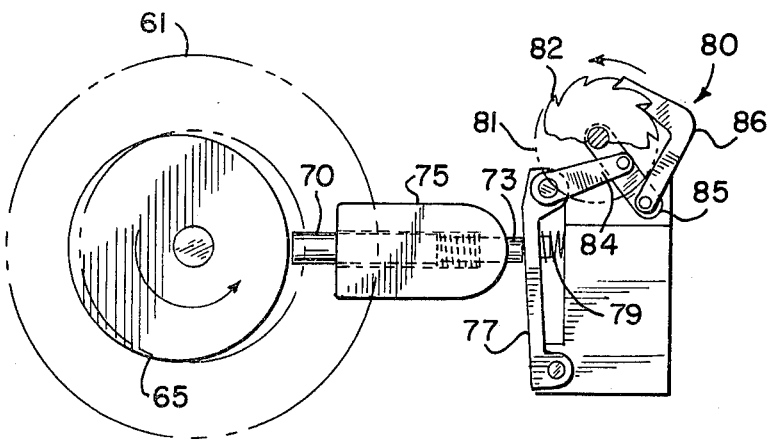
Fig. 6
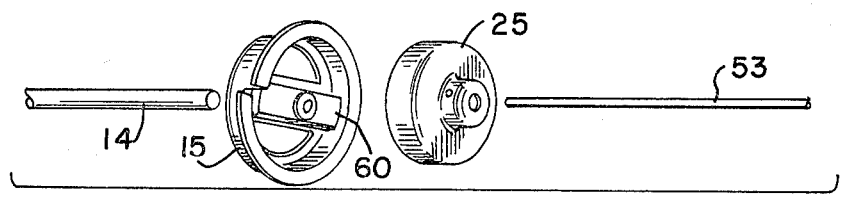
Fig. 7

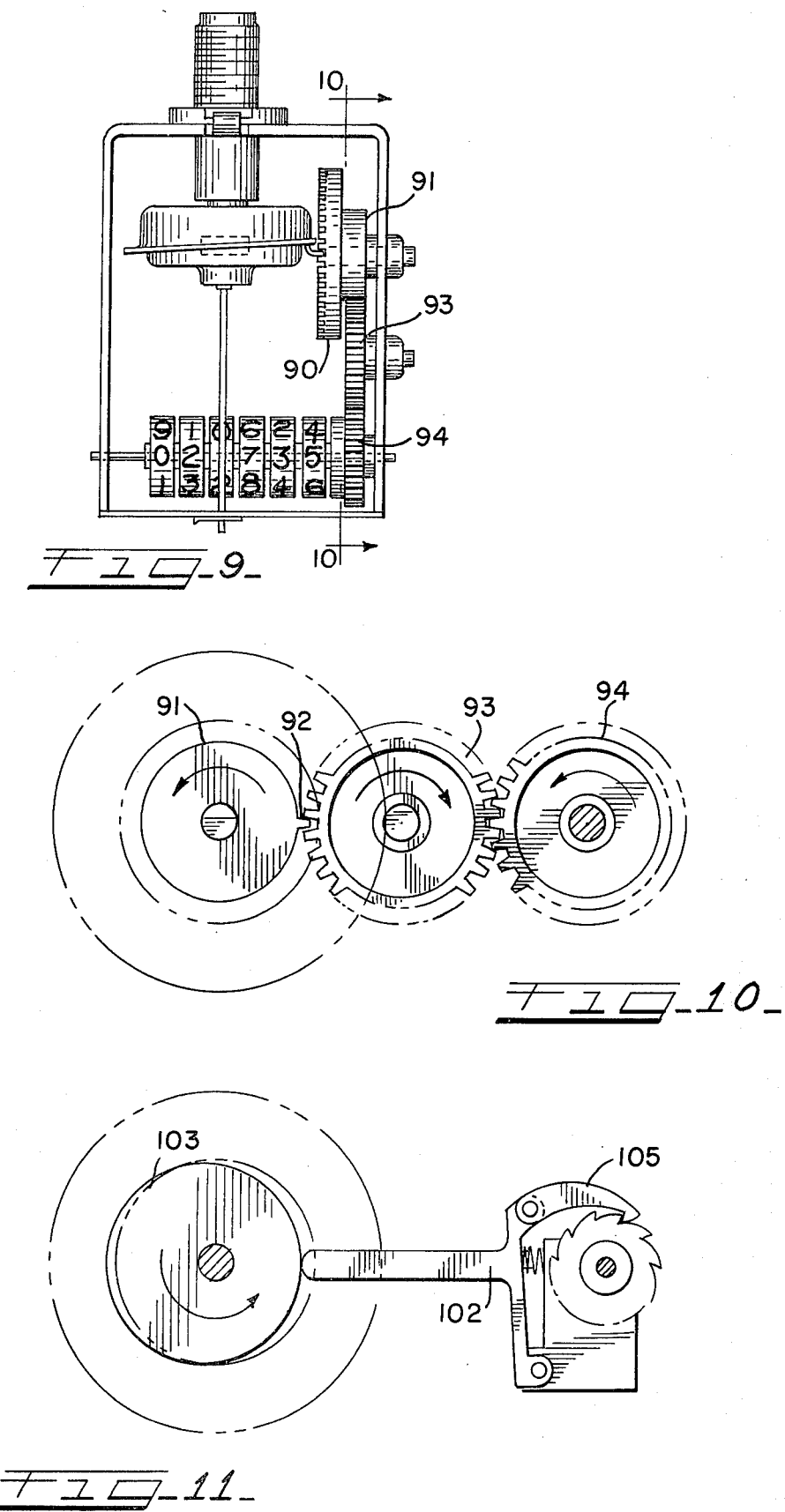

SPEEDOMETER-ODOMETER APPARATUS

BACKGROUND OF THE INVENTION

This invention relates to an improvement in speedometer drives and, in particular, to an apparatus forming an element of a speedometer-odometer assembly which transfers and translates the rotation of the speedometer drive cable to the remaining elements of the speedometer-odometer assembly.

Conventional speedometer-odometer assemblies for recording the speed and distance traveled by a moving vehicle are fairly simple mechanical devices including a threaded or worm drive shaft mounted on a frame and connected for rotation at one end with a speedometer drive cable being rotated by the revolving wheels of the vehicle, and having disposed at its opposite end a magnet which rotates with it. When the shaft is rotated by the speedometer drive cable, the threaded portion of the shaft engages the teeth of a crossover gear running substantially perpendicular to the shaft and imparts a rotation to this crossover gear. At the opposite end of the crossover gear are disposed circumferential threads, which engage and rotate, in a similar manner, the teeth at one end of an odometer worm drive gear. This odometer worm drive gear has threads at its opposite end engaging teeth disposed about the circumference of one of a series of numeraled odometer drums which register the revolutions of the wheels of the vehicle as distance for the benefit of the driver of the vehicle.

The magnet located at the forward or driving end of the rotating threaded shaft creates, upon rotation, a magnetic flux which causes a spring-biased needle registering the speed of the vehicle to be held in a certain position with respect to a reference point, depending upon the speed of rotation of the speedometer cable and connected shaft.

The use of a series of gears in the odometer assembly permits a significant reduction from the speed of rotation of the speedometer drive cable to the speed of rotation of the odometer numeral drum. The greater this gear reduction, of course, the lesser the chances of mechanical malfunction of the assembly and the greater the accuracy of the readings.

U.S. Pat. No. 3,739,653 improved on the above-described speedometer-odometer drive assemblies and, in particular, in the worm drive or threaded shaft element responsible for transferring the rotation of the speedometer drive cable to the odometer gear train and for translating the rotation of this cable to the speedometer needle to register speed. This improvement eliminated the necessity of machining this particular worm drive element and, therefore, reduced the time and expense necessary to produce this element and the overall speedometer-odometer assembly without affecting the quality and operation of the finished product. This worm drive apparatus accomplished the same function as more expensive machined or cylindrically-turned worm drive elements by an annular plate means or disc disposed on a drive shaft connected to the speedometer drive cable and rotatable therewith. This disc is split or cut from its periphery toward its center at at least one point about its circumference and the facing edges of the cut are one or both upset or separated with respect to the radial plane of the surface of the disc. The outside edge or periphery of the disc engages the teeth of a conventional odometer drive worm element of a speedometer-odometer assembly in such a manner that when the speedometer cable imparts a rotation to the drive shaft and the disc, the edge of the disc at the point of upset engages successive teeth on the odometer worm drive, thereby causing it to rotate in the same manner as in a conventional drive train.

In addition, the annular plate means, which substitutes for the threaded portion or worm gear of the prior apparatus, may also be shaped in its surface, without machining, to receive the magnetic drive means necessary to produce the magnetic field driving the spring-biased speedometer needle. This is done by cutting or forming two flanges from the surface of the disc and bending these flanges perpendicular to the surface on opposite diameters so that a magnet may be placed between them, while providing a definite space between the inside surface of each flange and the end of the magnet. In this position, each flange allows the flux cup disposed over the magnet to pass between it and the end of the magnet as the flanges rotate with the disc about the circumference of the flux cup. Thus, the disc not only drives the odometer, but also serves to drive the speedometer.

While these above-described improvements aided in reducing costs associated in the gear train for transferring the rotational movement of the speedometer cable to the speedometer-odometer assembly, it has been found that the odometer worm drive of the prior art must necessarily be loosely engaged with the annular plate in order to effect the free rotation of the worm drive and the odometer. This loose engagement can lead to increased wear in the odometer drive train, more specifically, in the gear teeth. A jar or vibration encountered by the assembly can cause the worm gear to rotate to a position slightly out of engagement with the annular plate. The continued rotation of the annular plate forces the worm gear into correct alignment, but at the cost of worn teeth, wear and an annoying "clicking" sound, both problems caused by the annular plate making a sudden clash with the worm gear. Of course, the worn teeth worsen the loose gear engagement, causing even more noise.

The odometers of the prior art also have no commercially acceptable manner to prevent the backward-driven rotation of the odometer. In fact, the act of proceeding in reverse causes the odometer drive and the odometer display to also proceed in reverse, thereby causing error in the odometer reading as to the total amount of distance traveled.

DESCRIPTION OF THE INVENTION

The subject invention involves a speedometer-odometer drive assembly which affords a superior accuracy and a truer reading of the actual distance traveled by the vehicle, whether in the forward or reverse mode. In addition, means are provided to limit rotation of the odometer numeral drums to a forward direction only.

The subject invention utilizes a field cup to transmit the rotational drive of the speedometer cable to a face gear. This arrangement allows a tighter engagement of the teeth on the face gear with the outside edge or periphery of the field cup, by providing gear teeth which can make a fuller engagement with the field cup since the teeth need not have a pressure angle, as must the teeth of spur gears, but the teeth may define an open-ended rectangle instead. Thus, a better and more precise meshing of the field cup with the face gear is possible, resulting in a quieter drive movement and less wear of associated parts. The use of the face gear to translate the rotary motion of the field cup also makes possible a variety of interfaces or drive transfer means to drive the odometer display.

In one embodiment, a circular cam is mounted slightly off center to one side of the face gear and captivated in an oblong follower in one end of a drive arm pivoted at its midsection. Thus, the rotation of the face gear causes the cam to oscillate an end of the arm vertically through the action of the cam against the follower. As the arm pivots about its midsection, the opposite end of the arm, or the gear-engaging portion, is oscillating in opposite directions. This gear-engaging portion advances an associated odometer drive gear one tooth and space for every complete oscillatory movement of the arm. This drive gear, in turn, rotates the odometer display to provide the indication of distance traveled. Since the drive arm does not differentiate in the direction of the cam, but oscillates in the same manner regardless of the counterclockwise or clockwise rotation of the cam, the odometer display can indicate only in one direction.

Another embodiment involves a single tooth gear, which, through an idler gear, rotates the odometer drive gear to drive the odometer assembly. Yet another embodiment makes use of a drive arm responsive to the eccentric motions of a cam mounted on the face gear to drive the odometer display through the action of the drive arm on a ratchet and pawl odometer drive assembly.

Accordingly, it is an object of this invention to provide an improved speedometer-odometer drive assembly having an apparatus for connecting the speedometer drive cable to the odometer drive and the speedometer needle, which provides a longer wearing, quieter gear train assembly.

It is a further object of this invention to provide an apparatus for transferring and translating rotation of a conventional speedometer drive cable to an odometer drive train to indicate distance traveled without regard to forward or reverse mode of travel.

It is also an object of this invention to provide an apparatus for transferring rotation of a speedometer drive cable to an odometer drive train through a face gear which is easily formed and provides superior accuracy of following movement.

These and other important objects of this invention will become apparent from the following description taken in conjunction with the drawings illustrating the preferred embodiment, wherein:

FIG. 1 is a plan view of a speedometer-odometer assembly showing the improved drive train apparatus of this invention;

FIG. 2 is a cross-sectional view of the subject invention taken along line 2—2 of FIG. 1;

FIG. 3 is a cross-sectional view taken along line 3—3 of FIG. 1, showing the gear-engaging arm of the subject invention in the down stroke;

FIG. 4 shows the gear-engaging arm of FIG. 3 in the upward stroke, thereby rotating the gear one tooth from that shown in FIG. 3;

FIG. 5 shows a plan view of another embodiment of the subject invention;

FIG. 6 is a cross-sectional view of one embodiment of the subject invention taken along line 6—6 of FIG. 5;

FIG. 7 is an exploded view, showing the field cup and flux cup relationship of the subject invention;

FIG. 8 is a developed view of the face gear, showing the thread construction;

FIG. 9 is a plan view of one embodiment of the subject invention using a single toothed drive wheel mounted on the face gear;

FIG. 10 is a cross-sectional view of one embodiment of the subject invention taken along the line 10—10 of FIG. 9; and, FIG. 11 is a cross-sectional view similar to FIG. 6 showing another manner of driving a ratchet and pawl odometer drive means.

Referring now to the drawings and, more particularly to FIG. 1, there is shown a speedometer-odometer assembly generally at 100. This assembly 100 includes a frame 12 to support the elements of the assembly and a hollow shaft or sleeve 16, allowing attachment of the frame 12 and assembly 10 to the body of a desired vehicle. Disposed through the center of and surrounded by the hollow shaft or sleeve 16 is a drive shaft or spindle 14. This drive shaft or spindle 14 is freely rotatable about a central axis and is connected at its end (not shown) to the speedometer drive cable (also not shown), providing a means to drive the odometer and speedometer of the subject invention. The drive shaft 14 has disposed at its opposite or inward end a field cup 15, which is fixedly attached to the drive shaft 14 for rotation about a central axis. The field cup 15 may be spaced from the frame 12 by the appropriate spacer 13 to enable its correct placement with respect to the frame 12.

The field cup 15, which forms the worm drive apparatus of the subject invention, has upstanding flanges or side walls 19 which are preferably continuous, although such continuity is not necessary. These side walls 19 have a peripheral rim 21 generally at right angles to the side wall 19 and which are discontinuous at at least one point 20, as shown in FIG. 2. This discontinuity has facing edges 23, formed by a split or cut, so that these facing edges 23 are upset or axially spaced with respect to the plane of the radii of the rim 21, as shown in FIGS. 1 and 2, so that a distinct angle is formed between them or with the radial plane of the rim 21. The facing edges 23 lie in intersecting planes. Field cup 15 carries a magnet 60 between the side walls 21 (FIG. 2).

A flux cup 25 includes an inverted cylinder of soft metal opened at its end and brough within and adjacent to field cup 15, which is disposed over magnet 60 (FIG. 7). Flux cup 25 has a speedometer axle 53 disposed through its open top end, one end of which is placed in a recessed top portion of the drive shaft 14 so that the speedometer axle 53 and flux cup 25, which is firmly attached thereto, may rotate freely with respect to drive shaft 14 but about the same central axis. Axle 53 is biased by a spring 54 (FIG. 1) on the outside of the frame 12 so that when the drive shaft 14 is not rotating, the axle 53 and the flux cup 25 are returned to the same original position or reference point. Thus, when the vehicle is not moving, the flux cup 25 and the axle 53 are returned to their original positions and the needle on the gauge reads zero. The end of speedometer axle 53 entending beyond spring 54 is attached to a speedometer needle (not shown) which registers speed on a gauge visible to the operator of the vehicle.

The outermost drum of the odometer 50 is generally fixedly attached to a gear wheel 51 for direct following movement (FIG. 1). The rotation of this gear wheel 51 drives the odometer. A gear driving means or anchor portion of the drive arm 43 rotates the gear wheel 51 through a bifurcated pawl, having angularly extending arms 47, each with an anchor tooth 45 and 46 (FIGS. 3 and 4).

The drive arm 40 is pivotal about axis 41. The gear driving means or anchor portion 43 comprises one end of drive arm 40. When pivoted about its axis 41 in an angular oscillatory manner, the anchor portion 43 engages and disengages the anchor teeth 45 and 46 with the escape wheel 51. Upon each engagement and disengagement, the escape wheel is driven forward one tooth and one space. Thus, whether the drive shaft 14 is rotated clockwise or counterclockwise, corresponding to the forward or reverse direction of travel of the vehicle, the cam follower is limited to movement in one plane only and the oscillatory nature of that movement causes an identical response in the odometer drive regardless of the direction of rotation of the drive shaft.

The face gear 30 revolves about axis 33 and has teeth 31 cut into one side thereof (FIG. 3). The teeth of this face gear have opposite parallel faces forming, in effect, a rectangular tooth with open-ended rectangular spaces between the individual teeth 31 (FIG. 8). This tooth pattern allows an efficient meshing of the gears, with much less play then possible in conventional drive trains. In addition, this efficient meshing affords a quiet operation and contributes to a longer wear life.

Opposite the face side of the gear 30, and preferably formed integral with the gear 30, is a camming means 35 disposed slightly off center of the rotational axis 33 of the face gear 30 (FIGS. 3 and 4). In one embodiment, this cam is captivated in an oblong opening 49 in the drive arm 40 opposite the anchor portion. Thus, upon rotation of the face gear 30, the drive arm 40 follows the movement of the cam 35 with angular oscillatory motion, causing the drive arm 40 to pivot about axis 41 and reciprocate the anchor portion 43 to successively engage and disengage the upper tooth 45 and lower tooth 46 in complementary fashion with the teeth of the odometer drive means 51.

As shown in FIG. 3, the upper anchor tooth 45 is in complete engagement with the teeth of the escape wheel 51, while the lower anchor tooth 46 is disengaged. Upon the movement of the drive arm 40, the anchor portion 43 pivots upward, engaging the anchor tooth 46 with the escape wheel 51, forcing the escape wheel 51 in a counterclockwise movement to the position shown in FIG. 4. Continuing the oscillatory motion of the drive cam 40 causes the disengagement of the lower anchor tooth 46 and the re-engagement of upper anchor tooth 45, forcing the escape wheel 51 to travel a distance of one tooth counterclockwise.

As is obvious, the successive engagement and re-engagement of the upper and lower anchor teeth 45 and 46 cause the odometer drive means 51 to rotate in direct relation to the number of turns of the face gear 30. Therefore, it is seen that the speed of the odometer is dependent upon many factors, among them the shape of the camming means 35 and the number of teeth in face gear 30. Generally a 2,000 to 1 ratio is found desirable. Thus, the face gear would have 80 teeth and the odometer drive wheel would have 25 teeth.

In the operation of the subject speedometer-odometer assembly 100 using the improved apparatus of the subject invention, the speedometer cable (not shown) receives a rotation from one of the wheels of the moving vehicle. This speedometer cable, which is in communication with drive shaft spindle 14, imparts this rotation to shaft 14 so that the shaft 14 is rotated about its central axis (FIG. 1). As the shaft 14 is rotated, the field cup 15, which is fixedly attached to the inward end of drive shaft 14, is similarly rotated about this same central axis.

Thus, the magnet 60, which is likewise attached to shaft 14 within the field cup 15, is rotated about the central axis within flux cup 25. As magnet 60 is rotated within the flux cup 25 and field cup flange 19 is moved about the outside wall of cylindrical flux cup 25, a magnetic force field is created within said flux cup, the strength of which increases in proportion to the speed of rotation of shaft 14.

Since the flux cup 25 is fabricated of soft metal, it ordinarily dissipates the flux lines created by the magnetic field as soon as the magnetic field is removed. However, when the magnet producing the field is rotated at a high speed, such flux lines do not dissipate in the brief interval of time between the first creation by the magnetic field and the later return of the field. Thus, the force lines retained in the soft metal of the flux cup 25 are increased with the speed of rotation of the shaft 14 and the magnet 60. As the speed of rotation of the shaft 14 is increased and the strength of the magnetic force field is increased, the flux cup 25 is rotated with speedometer axle 53 to the extent that the increasingly more uniformly distributed field developed about the interior circumference of the flux cup 25 overcomes the oppositely-directed force of spring 54. As the force of spring 54 is overcome, the flux cup 25 is moved to a position in direct relationship to the force of the spring and the speed of the rotation of the shaft 14. A speedometer needle (not shown), which is attached to the projecting end of the speedometer axle 53, then indicates to the operator of the vehicle the approximate calibrated speed at which the vehicle is moving.

In the operation of the odometer means from the same apparatus of the subject invention, the field cup 15 rotating about the speedometer drive shaft 14 is placed in a position within the frame 12 adjacent to face gear 30 so that the periphery or rim 21 of the field cup 15 is disposed in the space or groove between the teeth 31 of the face gear 30 (FIG. 3). As the field cup 15 rotates about the central axis of shaft 14, it imparts a rotation to face gear 30 and cam 35 about the axle 33. At the point of discontinuity on the rim 21 of the field cup 15 caused by the split or cut 20, facing edge 23 is upset or axially spaced a definite distance from the other or lower facing edge 23. When this discontinuity is reached, the upper facing edge 23 engages the space or groove on the opposite side of the next succeeding tooth 31 on the face gear 30, causing the cam 35 to be eccentrically rotated about the central axis 33.

FIGS. 5 and 6 are presented as another embodiment of the unique face gear drive apparatus of the subject invention. FIG. 5 shows a face gear 61 and camming means 65, which are identical to the face gear 31 and camming means 35 of FIG. 1 and are driven by the field cup 15 in the same manner. Pin 70 is pisposed for free linear movement within cylinder 75 (FIG. 6). A leaf 77 is pivoted at one end and biased against the odometer drive end 73 of the pin 70 by a spring 79 or other resilient means. A ratchet and pawl mechanism 80 comprises an arm 84 mounted on an intermediate arm 85 pivotal about the axis of rotation of the drive wheel 81 and having one end pivotally attached to the top of the leaf 77 for following movement with the leaf 77. On the opposite end of the intermediate arm 85 is mounted a pawl 86 for engaging the sloping teeth 82 of the odometer drive wheel 81, thereby operating the odometer. By the biasment of the leaf 77 against the pin 70, the pin 70 is made to follow the camming means 65 at end 71. The eccentric rotation of the camming means 65 with the face gear 61 causes the oscillatory motion of the pin 70 and the following oscillatory pivotal motion of the leaf 77, thereby causing the pawl 83 to successively engage each tooth 82 and rotate the odometer drive wheel 81.

Another manner of translating the rotational motion of the face gear to the odometer drive assembly is shown in FIGS. 9 and 10 where a single tooth gear 91 is centrally mounted on the face gear 90 (FIGS. 9 and 10). As with the cam of the previously described embodiments, the gear 91 may be formed integral with the face gear 90. Idler gear 93 is mounted for operative engagement with the single tooth gear 91 and also for operative engagement with the odometer drive gear 94. Thus, for every single revolution of the single tooth gear, the tooth 92 of the gear 91 rotates the idler gear 93 one tooth, which, in turn rotates the odometer assembly.

A further embodiment shown in FIG. 11 which employs a drive arm similar to that shown in FIG. 6, this embodiment, however, employs a single piece drive arm 102 directly attached to the ratchet and pawl mechanism to drive the odometer. Thus, as the eccentric cam 103 rotates, the drive arm 102 follows and oscillates in direct response thereby causing the ratchet and pawl mechanism to advance the odometer in the same manner as that shown for FIG. 6, or, through a single arm 105 pivotal about the top of the drive arm 102 and engaging the odometer drive wheel from the top, rather than from underneath as in FIG. 6.

While shown and described in conjunction with a conventional odometer, the apparatus of the subject invention should be understood as encompassing a use with an electronic display or read-out, whereby every oscillation of the drive arm causes an impulse or generates a signal which is transmitted to an appropriate display to show the distance traveled.

The apparatus of this invention may be constructed of any suitable material which is hard, resistant to wear, may be easily cut and slightly bent to the desired shape, such as stainless steel or stainless steel alloys.

The flux cup, as stated previously, would be constructed of a soft metallic substance so that it is prone to quickly accept the release of the magnetic field.

The other gears and numeral drums in the speedometer-odometer assembly have been, in the past, formed from wear-resistant, durable material such as stainless steel alloys or high-impact plastics. In particular, face gear 30 may be molded from such a high-impact plastic with the camming means 35 molded integrally with face gear 30. However, these may also be molded separately and attached during final assembly.

While this invention has been described in relation to preferred embodiments thereof, it will be apparent to those skilled in the art that structural detail are capable of wide variation without departing from the principles of the invention.

I claim:

1. An apparatus particularly for use in a speedometer and odometer drive assembly, said apparatus including a drive means, a face gear mounted for rotation and operatively connected to said drive means, a camming means mounted on said face gear for eccentric rotation, a drive arm, said drive arm being pivotal about a central portion thereof, a cam follower including an opening in said drive arm, said opening captivating said camming means to cause a following movement of said camming means, at least one angularly disposed extension on said drive arm, said extension having an engaging means to engage a display means, said drive means driving said face gear to impart a rotation to said camming means, said cam follower causing an angular oscillatory motion in said drive arm in response to the rotation of said camming means, said angular oscillatory motion causing said drive arm to successively engage and disengage said engaging means with said display means to indicate total distance traveled.

2. The apparatus of claim 1 wherein said gear engaging means comprise a single tooth escapement apparatus having at least two anchor teeth, each of said anchor teeth mounted on a different arm extending angularly of said drive arm.

3. The apparatus of claim 1 wherein the teeth of said face gear are of a rectangular profile for smooth and quiet operation.

4. The apparatus of claim 1 wherein said display means comprises a visual electronic read-out responsive to the oscillation of said drive arm.

5. An apparatus particularly for use in a speedometer and odometer drive assembly, said apparatus including a drive means, a face gear mounted for rotation and operatively connected to said drive means, a first gear mounted on the axis of rotation of said face gear for direct following movement therewith, a second gear, said first gear comprising a single-toothed gear which engages and rotates said second gear one tooth per revolution of said first gear, an odometer drive gear operatively engaged with said second gear and with an odometer display means, said drive means driving said face gear to impart a rotation to said first gear, said first gear thereby driving said second gear, said second gear driving said odometer drive gear to indicate distance traveled in said odometer display means.

6. In a speedometer-odometer assembly having a drive cable, a single revolution drive gear on one end of said drive cable for direct following rotation, said drive gear operatively connected to an odometer drive gear to translate said drive gear rotation to an indication of distance, wherein the improvement comprises a face gear, said face gear engaging said drive gear, a cam having a peripheral surface mounted on said face gear for eccentric rotation therewith, a support means fixedly mounted within said assembly, a pin mounted on said support means for linear movement, said support means being spaced from said peripheral surface for assuring the straight linear motion of said pin, said pin being biased against said peripheral surface for direct linear following oscillatory movement, said pin transferring said oscillatory motion to a ratchet and pawl assembly, said ratchet and pawl assembly being operatively engaged with said odometer drive gear, said odometer drive gear thereby being rotated by the oscillatory motion of said ratchet and pawl assembly to indicate distance traveled.

7. The speedometer-odometer assembly of claim 6 wherein said support means comprises a sleeve mounted with a longitudinal axis substantially perpendicular to the peripheral surface.

* * * * *